United States Patent [19]

McCaskill et al.

[11] 4,435,777
[45] Mar. 6, 1984

[54] INTERACTIVELY REARRANGING SPATIALLY RELATED DATA

[75] Inventors: Rex A. McCaskill; John W. McInroy; Paul D. Waldo, all of Austin, Tex.

[73] Assignee: International Business Machines Corporation, Armonk, N.Y.

[21] Appl. No.: 264,387

[22] Filed: May 18, 1981

[51] Int. Cl.³ .............................................. G06F 3/14
[52] U.S. Cl. .................................. 364/900; 340/750; 364/200
[58] Field of Search ... 364/200 MS File, 900 MS File, 364/300; 340/709, 723, 724, 750

[56] References Cited

U.S. PATENT DOCUMENTS

| | | | |
|---|---|---|---|
| 4,057,849 | 11/1977 | Ying | 364/200 |
| 4,080,659 | 3/1978 | Francini | 364/200 X |
| 4,101,879 | 7/1978 | Kawaji | 340/750 X |
| 4,240,075 | 12/1980 | Bringol | 340/750 X |

Primary Examiner—Edward J. Wise
Attorney, Agent, or Firm—Richard E. Cummins

[57] ABSTRACT

An improved method is disclosed for assisting the operator of an interactive text processing system in entering instructional data which defines to the system changes to stored spatially related data. The method involves the operator identifying to the system the task to be accomplished and the name and the location of the source file in the system, displaying to the operator on the screen of the display device the header portion of the file, which defines the fields or column names, and converting sequences of operator keystrokes representing conventional text editing operations on selected fields of the displayed header to instructions for use by the system in processing records of the file.

7 Claims, 6 Drawing Figures

H1----------------------------------------
                    ┌─73
H2sPATENTsNUMBERss  │ ..   . . . . . . . . . . . . . . .
                    │
H3---------┌─┐------┘----------------------
           70

FIG. 5

| | |
|---|---|
| L | No. of character positions in vector; 9-1000 |
| L | including 4 row format bytes and 5 col. format bytes |
| T | Type of row = always zero |
| R | Row number 0 to 255 |
| $\ell$ | No. of character positions in col. vector |
| $\ell$ | including r format bytes |
| t | Type of row, 0 = direct data |
| c | Column number |
| d0 | Direct data or pointers |
| $\approx$ | if indirect data |
| dn | |
| $\ell$ | |
| $\ell$ | |
| t | |
| c | |
| d0 | |

FIG. 6

INTERACTIVELY REARRANGING SPATIALLY RELATED DATA

DESCRIPTION

1. Technical Field

This invention relates in general to interactive text processing systems and, in particular, to an improved method for assisting an operator in defining to the system how spatially related data from an existing file is to be rearranged for display or copying.

2. Related Application

Ser. No. 264,368, filed May 18, 1981 is directed to a method for displaying and editing spatially related data in an interactive text processing system where the spatially related data is stored in vector format and in which one editing process is used for editing both text and file type data.

3. Prior Art

A typical interactive text processing system currently operational in many office environments comprises a keyboard, a display, a printer, a diskette storage device and a microprocessor which has been programmed to cause interaction of the various system components to perform numerous text processing functions. One of the main functions of a text processing system is to create a document on the output printer which may, for example, be a single one-page letter or a multi-page manuscript. The interactive nature of these systems initially involves a query-response type mode of operation where the system displays the questions or available options to the operator and, perhaps, a number of responses. The operator then indicates the response by pressing a defined character key or by keying in the requested data. By such a procedure, the various parameters of a document format may be defined to the system. The system is then placed in the text entry mode so that actual text is keyed in by the operator and displayed on the screen in a format generally resembling that which would appear on the printed document.

It will be appreciated that the text is entered initially as a series of keystrokes, each of which is converted to a byte or character of data in the system that is subsequently stored in the memory of the microprocessor. Most keystrokes that are entered will represent characters of data and will be recognized as such by the microprocessor so that these will be transferred by the microprocessor to the display refresh buffer from which the characters will be displayed on the display screen. It will be recognized also that a limited number of keystrokes generate text format control data, such as a paragraph indent signal achieved by tabbing, or a carriage return signal. These text format bytes are recognized by the microprocessor which provides the required character control signals to the display refresh buffer. The other function of the microprocessor is to supply to the refresh buffer a cursor character signal which is displayed to the operator as an indication where the character representing the next keystroke will be displayed.

In many applications, after all the text has been entered, the operator requests a printed document from the system. The system then enters the printing mode and prints the document, employing the stored format parameters and the text. The document, as stored in memory, comprises a series of data and control characters and is generally transferred to diskette storage. The name of the document and the diskette number is also added to the index of documents kept by the system. This permits the document record to be subsequently retrieved.

After the printed document has been edited by the author, the operator recalls the document from diskette storage into main memory and causes it to be displayed by the system, which is placed in an update, or edit, mode. The operator may then position the cursor by operation of cursor move keys to a character position on the display which is to be modified, e.g., to a word to be deleted. The operator merely presses a delete key before moving the cursor through the characters of the word by the cursor move key, and the word is erased in storage by action of the microprocessor and will, therefore, not appear in the updated document. Other editing operations include adding words or moving words from one position to another. Each of the respective editing operations involves the operator following a prescribed series of steps which should be logical and simple to learn and which involve interaction with the system through the keyboard.

Those familiar with the internal operation of text processing systems employing microprocessors understand the various detailed steps that the microprocessor takes in converting a simple keystroke into a character on the display screen and to a byte of binary data in a storage location in memory while "simultaneously" controlling the position of the cursor on the display screen to assist the operator to properly format the document.

In most text processing systems, the text data is merely stored sequentially in memory as the sequence of keystrokes occurred, i.e., character data interspersed by the appropriate control data such as paragraph indents, carriage returns, line advances, etc. In many systems, the document format parameters, such as page length, left and right margins, line spacing, type font, etc., are stored independently of the text data and, hence, the text format parameters of the final document can be entirely different than the parameters employed when the text was initially entered into the system.

Sequential keystroke information storage of text data does permit the implementation of a number of different editing functions which enhance the performance and desirability of text processing systems. These functions range from the simple revision feature, such as deleting, adding or changing characters or words, to more sophisticated features, such as checking the spelling of all words in the document against a defined list of words, automatically replacing a defined word with another word at every occurrence in the document, or moving words or phrases from one position to another.

Text processing systems of the type described above, however, do not have the capability of easily manipulating data that is spatially related, such as data which is arranged in a matrix of rows and columns. Where it is also desirable to process spatially related data in an interactive text processing system, the prior art systems employ an entirely different set of programs for editing and processing spatially related data. One reason for the different set of programs is that there is an advantage in storing spatially related data in a vector format since this permits data processing type of functions, i.e., sorting of record fields or repositioning of fields, by the microprocessor quite easily. Hence, since the spatially related data is stored differentially in the system than text data, the editing functions which must also be done on the spatially related data have required in the past their own set of programs stored with the microprocessor.

It has been found that considerable storage space can be saved if the display and editing processes for text data can also be used for displaying and editing data stored in a vector format. The display and editing processes for text data in such a system may also be employed to display and edit the spatially related data by converting a predetermined amount of the vector stored data to text data. The display and editing processes then function as if the spatially related data were real text.

Such a system is described in copending application Ser. No. 264,368, filed concurrently herewith and assigned to the assignee of the present invention. As explained in the above-mentioned copending application, all of the potential parameters of the spatial relationship of the data or coordinate system are first entered into the text processing system in a conventional query-response mode. The system then displays the header portion of the matrix showing the name and width of each column or field. To assist the operator in adding new records to the file, the system positions the cursor at the starting position, which can be defined as row 1, column 0, character position 0. Data is then entered into each column and is displayed as conventional text data, the cursor being appropriately positioned after each keystroke. The operator also has the capability of moving the cursor one character position at a time in accordance with normal text conventions, or to the beginning of the next field or column. Internally, the captured keystrokes are stored in memory as conventional control characters and text data so text can be displayed in a conventional manner. The data of each row subsequently is encoded as a vector where the spatial relationship of the data in the matrix is defined, and the vector is stored for later use.

Subsequent modification of the vector is done either on the encoded vector, if the modification involves a change in the spatial relationship, or on the decoded vector, if the modification is to the actual data. An example of one modification which can be accomplished would be the relocation or repositioning in the matrix of rows in accordance with the data in one column, i.e., sorting or collating. Such operations in conventional text processing systems would be extremely cumbersome and time consuming, if not impossible. However, since all the data is identified spatially, it becomes a relatively simple matter for the microprocessor to identify the vector and to modify its spatial parameters in accordance with the desired changes.

If changes to the data per se are desired, the vector is merely decoded and the data displayed as conventional text. The data is then edited in a conventional text processing mode by the same process and programs employed to edit text data, thus avoiding the necessity of a completely new process to edit vector data. After editing, the spatial data is again encoded as a vector for storage.

In addition to the data processing functions mentioned in the above-described copending application, it is also desirable at times to both display or duplicate a file of spatially related data with the columns arranged in an order that is different than in the existing file. Presently known text processing systems do not provide such a capability where the operator interacts with the system in defining the rearrangement in a manner as if the data was conventional text data. The present invention provides an improved method for the operator to specify to the system the desired arrangement of columns in the display or new file.

The improved method can also be employed in merely editing an existing file in that the system can display to the operator only those fields which need editing and which the operator has specified to the system, along with the order in which they are to be displayed.

SUMMARY OF THE INVENTION

In accordance with one embodiment of the present invention, a new file of spatially related data is created from an existing file stored in the text processing system. The new file includes at least one column of data from the existing file, which appears in a different location in the new file. The repositioning of the column in the new file is achieved in the text processing system by the operator performing conventional text editing move operations on the column titles as they are displayed as a portion of the header frame of the existing file. The data generated by moving a field title in the header from its stored position to a new position is stored in the system and employed in generating the new file records, with each record being modified in accordance with the data stored, and is employed in displaying records from the existing file in the modified form. The improved method may also be embodied in a simple editing operation of an existing file.

It is, therefore, an object of the present invention to provide an improved method for manipulating spatially related data in a text processing system.

A further object of the present invention is to provide an improved method for displaying to the operator of an interactive text processing system only certain fields of an existing file which are to be edited, where the fields are displayed in the same or different order in which they appear in the existing file.

A still further object of the present invention is to provide for the operator of an interactive text processing system an improved method for indicating to the system a desired arrangement of stored spatially related data.

Another object of the present invention is to create in a text processing system a new file of spatially related data from an existing file where the fields are in a different order by providing a program which permits an operator to interactively enter data into the system which defines the new order of fields in each record of the new file as if the system were processing conventional text information.

A further object of the present invention is to provide in a text processing system which also processes spatially related data a method for an operator to interactively enter data into the system based on prescribed keystroke rules designed to illustrate to the operator on a display screen the movement of data from a first spatial position to a second desired spatial position wherein the interactively entered data is instrumental in creating the format of the new file.

The foregoing and other objects, features and advantages of the invention will be apparent from the following more particular description of a preferred embodiment of the invention as illustrated in the accompanying drawings.

BRIEF DESCRIPTION OF THE DRAWINGS

FIG. 5 illustrates the header portion of a spatially related data file stored in the system;

FIG. 6 illustrates in vector format data stored in the memory as a vector.

DESCRIPTION OF THE INVENTION

Figure 1:
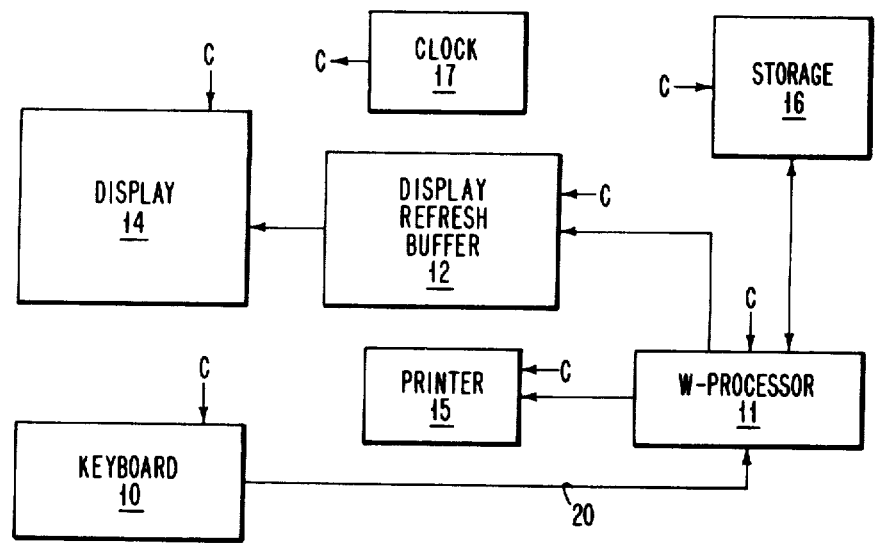
FIG. 1 is a block diagram of an interactive text processing system embodying the present invention.

The invention will now be described as embodied in an interactive text processing system of the type shown in FIG. 1. As shown in FIG. 1, the text processing system illustrated therein comprises a keyboard 10, a microprocessor 11, a display refresh buffer 12, a display device 14, a printer 15, and an auxiliary diskette storage device 16. A clock 17, for keeping the various components of the system in synchronism, is also shown in FIG. 1 and is effectively coupled to each of the units.

Keyboard 10 comprises a normal set of graphic symbol keys such as letters, numbers, punctuation marks, and special character keys, plus text format or control keys like carriage return, indent, etc. In addition, the keyboard includes a second set of control keys for issuing special control commands to the system. The control keys include cursor movement keys, keys for setting the keyboard into a number of different modes, etc.

Figure 2:
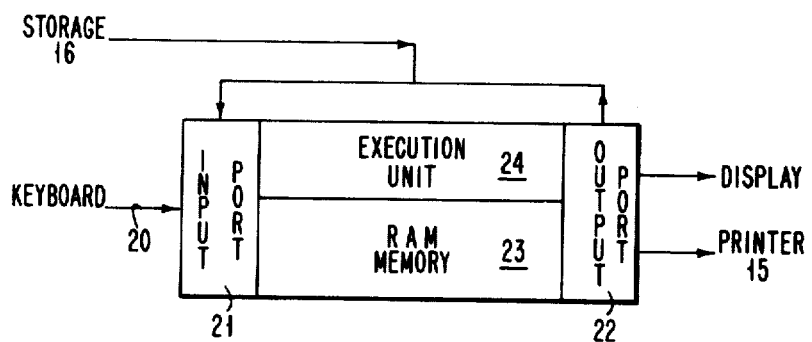
FIG. 2 is a functional diagram of the microprocessor shown in FIG. 1.

The keyboard is connected to the microprocessor by means of a bus 20. The microprocessor, as shown in FIG. 2, comprises an input port 21, an output port 22, a random access memory 23, and a process execution unit 24.

Figure 3:
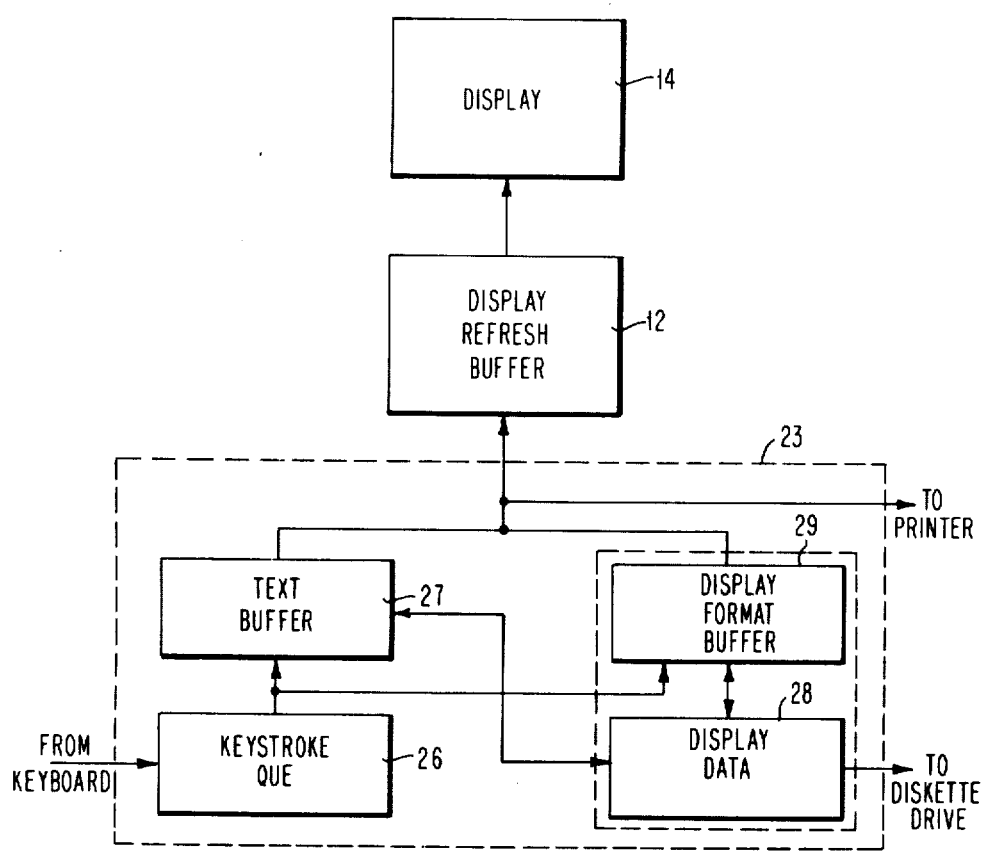
FIG. 3 is a functional diagram illustrating the data flow path between portions of the memory and the microprocessor and the display refresh buffer.

Functionally, memory unit 23 stores both instructions and data in specified sections which will be described in more detail later on in the specification. Data is entered into memory 23 from the keyboard as bytes of binary information through input port 21. As shown in FIG. 3, the section of RAM 23 which receives the keystroke data from the keyboard is designated keystroke que 26. Data to be displayed is transferred by a series of instructions from que 26 to the text buffer section 27 and then to the display refresh buffer 12 through output port 22 of the microprocessor. This is achieved in a conventional way by the microprocessor executing a series of move instructions.

The microprocessor 11 may be an INTEL model 8086 or any of the recognized functionally equivalent, currently available microprocessors.

The display refresh buffer 12 is shown as a separate buffer connected between the output port 22 and the display device 14. Buffer 12, in practice, is normally a part of the display device 14 and functions to control the generation of characters on the screen of the display device 14 by exercising on-off control of the beam as it traces a series of horizontal lines across the screen.

The output port 22 also supplies data stored in memory 23 to the printer 15 and diskette storage unit 16, each of which may have their own internal buffers which are not shown. Commands to transfer data from the random access memory 23 to the printer 15 or storage unit 16 are sent to the microprocessor by the operator from the keyboard 10.

Printer 15 may be any suitable printer known in the art. In most text processing systems, the printer is basically a standard output terminal printer having a type ball element or a daisy-wheel print element.

Diskette storage 16 may also be any suitable disk storage device which is capable of storing serial by byte data supplied to it at determined sector address locations, each of which are randomly addressable by the microprocessor to retrieve the data. Spatially related data supplied to diskette drive 16 is stored in the display data area 28 of the memory 23 in encoded form. The other section of memory 23 shown in FIG. 3 is the display format buffer area 29 which is involved in the handling of spatially related data in decoded form in accordance with the method of the invention described in Ser. No. 264,368.

Figure 4:
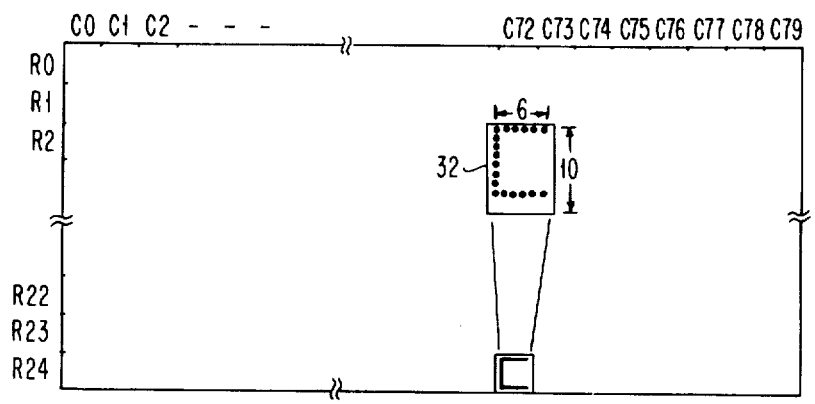
FIG. 4 is a diagrammatic view of the display shown in FIG. 1.

FIG. 4 is a schematic representation of the screen of display device 14. As shown in FIG. 4, the screen has, for example, the capability of displaying 25 lines of characters where each line consists of 80 character column positions. In practice, one character position consists of a matrix of dot positions or picture elements sometimes referred to as pels. A typical character matrix for a display of the type represented by device 14 would be a matrix of six wide by ten high pels, which has been designated by reference character 32 in FIG. 4. The interaction of the refresh buffer 12 and the display 14 is to convert the characters stored at a location in the buffer 12 to the corresponding character as formed in a 6×10 dot matrix at the equivalent location on the display 14. Display 14 generally is provided with its own set of electronics to achieve that conversion. The microprocessor 11 need only supply the address and load the buffer 12 with the appropriate characters.

The diskette storage device 16 also is generally provided with its own set of electronics for converting a byte of data supplied from the display data area 28 of memory 23 through the output pot 22 to a serial by bit stream of data to be recorded at a predetermined sector of the one addressed concentric recording track on the diskette. Data from the device 16 is supplied to the microprocessor 11 serial by byte from the addressed sector and storage tracks when requested.

It will be understood that all of the above described functions and interactions involving the microprocessor are achieved through suitable programs which are also stored in memory 23 and which are called into operation in response to data from the keyboard 10 or interrupt signals generated by the various components of the system shown in FIG. 1.

FIG. 5 illustrates the header portion of an existing file as it would be displayed to the operator on the screen of the display device of FIG. 1. It has been assumed for purposes of explaining the operation of the system that the header portion of FIG. 5 is displayed in response to the operator having defined the specific task of creating a new file from an existing file that is stored in the system. This task would be defined to the system in response to the operator viewing a menu which is presented on the display and typing in the appropriate response.

The header window 70 being displayed is stored in the display refresh buffer of FIG. 1 and consists of three separate lines H1, H2 and H3, where H1 and H3 are the upper and lower lines of the header and H2 is the line containing text and null characters and vertical field separator lines 73.

Lines H1, H2 and H3 are actually assembled in the display format buffer 29 under the control of the microprocessor. Line 2 is formatted in the display format buffer in a conventional text data stream format. As discussed in the previously mentioned copending application, line H2 is initially assembled in the area of memory referred to as the display data area 28. The format of the data in the display data area 28 is the vector format shown in FIG. 6. As shown therein, the format involves a row vector of four bytes LLTR, where LL is the number of characters in the row, T is the type, and R is the row number. The format further comprises a plurality of column vectors having a 4-byte format followed by the actual data. As shown, the column vector format comprises 11, defining the length of the vector, including the four format bytes, t representing the type which is either a zero or a one, and c which is the column number. The column heading, or field name, is located in a table and the column vector contains a 4-byte pointer to its location. As shown in FIG. 6, LL, the row may contain 1,000 bytes in a practical system, which implies that the system has the capacity to display the entire line in an overlap segmented mode under the control of the operator and cursor position.

The header data shown in FIG. 5 is assembled in the display data area in the vector format shown in FIG. 6 by the microprocessor. The header data is stored in a table in the memory of the microprocessor. The microprocessor assembles the complete row of header information in the display data area, which, as mentioned, may be considerably longer than can be displayed on the screen at any one instance. The microprocessor, therefore, converts only a slice of the formatted data to build the segment of the row in the display format buffer. The particular slice that is converted from the vector format in the display data area to conventional text data in the display format buffer is determined by the position of the cursor.

It will be assumed for the purpose of the present invention that the operator has been requested to create a new file from an existing file, as indicated below:

|      |    | Existing File<br>NAME - PATENT |   | New File<br>SERIAL |
|------|----|--------------------------------|---|--------------------|
| Col. | 0  | Record Number                  |   | Record Number      |
|      | 1  | Patent Number                  |   | Serial Number      |
|      | 2  | Issue Date                     |   | Issue Date         |
|      | 3  | Serial No.                     |   | Patent Number      |
|      | 4  | Filing Date                    | D |                    |
|      | 5  | Assignee                       | D |                    |
|      | 6  | 1st Inventor                   | D |                    |
|      | 7  | 2nd Inventor                   | D |                    |
|      | 8  | 3rd Inventor                   | D |                    |
|      | 9  | 4th Inventor                   | D |                    |
|      | 10 | 5th Inventor                   | D |                    |
|      | 11 | Priority Country               | D |                    |
|      | 12 | P. O. Class                    | D |                    |

As shown above, the new file contains a subset of the columns of the existing file, but arranged in a different order. The new file, however, will contain the same number of records as the old file.

It will be further assumed that the system has been arranged such that when the cursor move keys, right or left, are actuated, the cursor moves to the adjacent vertical bar 73 (FIG. 5) which separates adjacent fields. It should be understood that the destination of a moved field is conceptually between the two fields that are adjacent the cursored vertical field divider 73. Similarly, it should be assumed that operating the delete function key with the cursor at any character position in the field name deletes the field or column from the display.

In order for the system to create the serial number file from the patent file, as defined above, the operator performs a series of conventional editing tasks on the horizontally displayed header of the existing file. The first task involves the operator pressing the "move" key while cursoring the patent number field heading which sets up the system to record the present position of the cursor and position the cursor to the preceding field separator bar. The "move cursor right" key is then operated twice, which positions the cursor on the vertical bar separating the "issue date" field and the "serial number" field. The enter key is then pressed, which causes the system to again record the current position of the cursor. The cursor position that is stored by the system is defined in conventional text format, which must then be converted to a column number in vector format at some subsequent time by the microprocessor. Alternately, the microprocessor may keep track of the cursor position automatically by column as the cursor moves.

The information that is stored for the above defined task permits the microprocessor to locate and copy column 1 of each record or row in the existing file to column 3 of each record of the new file.

A similar sequence of operator keystrokes are involved in indicating to the system that the serial number column is to be moved to the beginning of the file. That data is also captured by the system for subsequent use in creating the new file.

Deleting fields from the header of the existing file merely involves positioning the cursor in the field to be deleted and pressing the delete key. The that indicates the field is to be deleted is also captured by the system. It should be understood that, as the cursor approaches the right hand edge of the display, the line segments automatically to display the next portion of the row.

The stored data reflecting the move and delete operations described above are subsequently converted by the microprocessor to column numbers corresponding to the vector formatted data. After all the desired editing operations are completed and the system is instructed to create the new file, a suitable program in the microprocessor takes each record of the existing file and copies column 3 as column 1, column 2 as column 2, and column 1 as column 3 in the vector format. The data which has been stored indicating the columns to be deleted prevents the remaining columns of the record from being copied. After all the records of the existing file have been processed, they are stored on the diskette in compacted data format for subsequent file processing.

It will be recognized by those persons skilled in the art that the described method is applicable to merely displaying records from an existing file in a modified form without actually creating a new file. For example, if the operator desires to add data to the last column of each record in the file, it would improve processing time if the last column was moved to the beginning of the record so that as each record is displayed, the field involved in the editing operation is actually positioned at the home position of the cursor and editing may proceed without any delay caused by positioning the cursor.

It will be appreciated by those persons familiar with the art that employing simple conventional text editing operations to create a new file from an existing file provides a valuable time-saving and performance enhancing capability to text processing systems.

Having thus described our invention, what we claim as new and desire to secure as a Letters Patent is:

1. An improved method for assisting an operator of an interactive text processing system in interactively entering instructional data into said system which defines to said system desired changes to be made to each spatially related vector formatted data record stored in an existing file which includes a header record having a plurality of named fields, the location of which in said header record establishes the spatial relationship of data in each said record, comprising the steps of:
   (a) displaying to said operator said header record as a horizontal row of said named fields, each of which is disposed at a location in said row determined in accordance with said vector format;
   (b) displaying to said operator a cursor disposed at a predetermined position in said horizontal row;
   (c) moving said cursor to a position in said horizontal row which corresponds to a field location involved in one of said changes;
   (d) initiating an edit operation corresponding to said one of said changes after the cursor is moved to said position in said horizontal row which corresponds to said one of said changes;
   (e) storing in said system said instructional data defining said edit operation performed in step (d) by said operator and said position in said header of said cursor when said edit operation was initiated; and
   (f) repeating steps (c), (d) and (e) for each desired said change to permit said system to subsequently edit each of said data records in said existing file in accordance with said stored instructional data.

2. The method recited in claim 1 in which said step of initiating an edit operation comprises said operator interactively entering instructional data into said system which defines a conventional move text operation from said one position in said row where said cursor is positioned when said edit operation is initiated to another position in said row.

3. The method recited in claim 1 in which said step of initiating an edit operation comprises said operator interactively entering instructional data into said system which defines a conventional delete text operation.

4. The method recited in claim 1 in which said system includes a keyboard and said instructional data is entered into said system by an operator interacting with said keyboard.

5. An interactive text processing system including a display device, a keyboard and a microprocessor which processes both conventional text data and spatially related data in which the spatially related data is stored in said system as a plurality of vector formatted data records along with a header record having a plurality of named fields, said records being converted from said vector format to conventional text stream data for displaying on said device, an improved method for changing each spatially related vector formatted data record stored in an existing file comprising the steps of:
   (a) displaying on said device to the operator said header record of said existing file as a horizontal row of named fields;
   (b) displaying a cursor disposed at a predetermined position in said horizontal row;
   (c) changing the order of fields in said horizontal row by performing a conventional text edit move operation involving interactive operator directed cursor movements which specify the movement of one of said fields from its current position to a new position; and
   (d) storing in said system at locations available to said microprocessor the instructional data reflecting each said move operation including the location in said header involved therewith to permit said microprocessor to modify the vector information of each said data record in said existing file in accordance with the stored instructional data.

6. The method set forth in claim 5 further including the step of
   (e) deleting at least one of said field names in said horizontal row by performing a conventional text editing delete operation involving other interactive operator directed cursor movements identifying a field to be deleted.

7. The method set forth in claim 6 further including the step of
   (f) displaying each said data record in said existing file with the changes in the data record specified by steps (c) and (e).

* * * * *